United States Patent [19]

Kretz

[11] 4,316,390
[45] Feb. 23, 1982

[54] METHOD AND EQUIPMENT FOR PLOTTING SECTION IMAGES OF OBJECTS SUBJECTED TO ULTRASONIC EXAMINATION

[75] Inventor: Carl Kretz, Zipf, Austria

[73] Assignee: Kretztechnik Gesellschaft m.b.H., Zipf, Austria

[21] Appl. No.: 88,368

[22] Filed: Oct. 26, 1979

[30] Foreign Application Priority Data

Jan. 11, 1979 [AT] Austria .................................. 200/79

[51] Int. Cl.³ .......................................... G01N 29/00
[52] U.S. Cl. ...................................... 73/620; 73/633; 128/660
[58] Field of Search .............................. 128/660–663; 73/619–620, 626

[56] References Cited

U.S. PATENT DOCUMENTS

| | | | |
|---|---|---|---|
| 3,605,724 | 9/1971 | Flaherty | 128/660 |
| 3,690,311 | 9/1972 | Schorum et al. | 128/660 |
| 3,856,985 | 12/1974 | Yokoi et al. | 73/620 |
| 4,010,634 | 3/1977 | Baumgartner | 73/620 |
| 4,058,001 | 11/1977 | Waxman | 128/660 |
| 4,102,204 | 7/1978 | Kretz | 73/626 |
| 4,141,347 | 2/1979 | Green et al. | 128/663 |

OTHER PUBLICATIONS

Glenn, W. "Ultrasound Diagnostic Signal Generator," Europaische Patentanmelding No. 0000067 made public Dec. 20, 1978.

Primary Examiner—Robert W. Michell
Assistant Examiner—Francis J. Jaworski
Attorney, Agent, or Firm—Kurt Kelman

[57] ABSTRACT

In a method of plotting section images of objects subjected to ultrasonic examination, a section surface of the object is scanned with a sound beam and echoes generated in response to the pulses of the sound beam are converted into echo signals which are plotted on a plotting surface, such as a fluorescent screen or a record carrier, to form a section image. The sound beams scans the section surface at a varying velocity. The pulse repetition period of the sound pulses is varied so that the section surface is scanned with a uniform transverse resolution. In equipment for carrying out the method, the pulse repetition frequency of the sound pulses is controlled by a trigger which generates trigger pulses at times which are functionally related to the scanning movement of the sound beam. The trigger may comprise programmed memory.

23 Claims, 4 Drawing Figures

METHOD AND EQUIPMENT FOR PLOTTING SECTION IMAGES OF OBJECTS SUBJECTED TO ULTRASONIC EXAMINATION

SUMMARY OF THE INVENTION

This invention relates to a method of plotting section images of objects subjected to ultrasonic examination, particularly for medical diagnosis, wherein a beam of sound pulses is cyclically moved to perform a scanning movement in a preselected section surface of the object being examined at a scanning velocity which varies during each cycle in accordance with a scanning velocity function. Echoes are generated in the section surface in response to the sound pulses and are represented on a plotting surface, for example they are displayed on a fluorescent screen or recorded on a record carrier, at locations which are geometrically coordinated with the locations at which corresponding echoes have originated in the section surface, and the velocity of the scanning movement of the sound beam in the section surface is varied, particularly in dependence on its instantaneous position in the section surface.

The invention relates also to equipment for carrying out the method and comprises a sound transducer head or sound transducer which defines a sound path and is operable to project a beam of sound pulses along said sound path into an object to derive electric echo signals from echoes generated in the object in response to the sound pulses, and a scanning mechanism operable to impart to the sound path a cyclic movement in a preselected section surface in the object at a scanning velocity which varies during each cycle in accordance with a scanning velocity function. The equipment also comprises plotting means comprising a plotting surface and arranged to represent the echo signals on the plotting surface, for example to display them on a fluorescent screen or record them on a record carrier, at locations which are geometrically coordinated with the locations at which said echoes have originated.

In virtually all methods of the kind defined, the sound path defined by the sound transducer head or sound transducer is mechanically moved by drive means or a scanning mechanism to perform a pivotal movement, or the sound transducer head or sound transducer is moved along a straight line. In most cases, the sound path is reciprocated. In case of a pivotal movement, the axis thereof may be close to the surface of the object or may be outwardly spaced from said surface so that section surfaces having basically a triangular or trapezoidal configuration are scanned if the sound beam is directly introduced into the object. It is also known to use a rotating sound transducer head, which has a sound transducer that is activated whenever it faces away from the object and in which the projected sound beam is reflected by a parabolic reflector before entering the object.

In all known methods of the present kind, pulses are generated at a frequency which may be preselectable but in any case is constant during a given examination. For structural reasons and owing to the influence of mass forces and other influences, the scanning movement of the sound beam cannot be performed at constant velocity. Owing to the changing velocity of the scanning movement of the sound beam, the section surface will be scanned with an irregular transverse resolution if the pulse repetition frequency is constant, as is usual.

Desirably, the brightness of the display at different locations is a measure of the strength of the echoes which have been received and is interpreted as such measure by the viewer. A scanning with an irregular transverse resolution will disturb that impression or will result in an incorrect interpretation regarding the significance of the gray value of the display. That phenomenon will be particularly undesirable when the scanning movement of the sound beam in the object must be performed at high velocity because a high picture frequency is required in order to obtain a moving section display.

All attempts previously made with the aim to eliminate the above-mentioned disadvantages entirely or in part have had the object to perform the scanning movement of the sound beam at a velocity which is constant as possible at least in the most significant part of the range which is scanned.

In equipment which comprises a rotating sound transducer head and a parabolic reflector for an indirect transmission of the sound beam to the object it has already been attempted to drive the sound transducer head at a varying angular velocity. This has been accomplished either by the use of a crank drive having offset axles or by a friction wheel drive comprising a friction wheel which is non-circular, e.g., elliptical or oval.

In arrangements in which a pivotal movement is imparted to the sound transducer or sound transducer head, the sound transducer or sound transducer head has been mounted on the shaft of a galvanometer, which is supplied with a triangular voltage waveform from a generator so that the pivotal movement is theoretically performed at uniform angular velocity. But in two designs of this type which have been described, the uniform angular velocity can be obtained only theoretically if the moving masses are neglected as well as the inertia forces which necessarily arise during the non-uniform movement of the sound transducer head and which react on the drive means so that the latter cannot perform a uniform motion although this would be required for the concept which has been proposed. If the moving mass of the drive means is a multiple of the moving mass of the sound transducer head to be moved, the entire arrangement will become heavy and unhandy and the force-transmitting means will be heavily stressed by the inertial forces.

A uniform angular velocity can impart to the sound beam by a sound transducer head which comprises a wheel that is driven at constant angular velocity and provided at its periphery with a plurality of sound transducers, each of which is activated whenever it moves past a window that is formed in the housing of the sound transducer head and faces the object. That method and equipment differ in kind from the subject matter of the present invention and involve a higher expenditure because the wheel must be provided with a large number of sound transducers, which must be identical to a high degree. The expenditure is due to the number of sound transducers, and to the need for a correct selection of the sound transducers and for a matching thereof.

It is an object of the invention so to improve the method described first hereinbefore that the section surface is scanned with a controlled and particularly uniform transverse resolution.

This object is accomplished in accordance with the invention in that the pulse repetition period of the sound pulses is varied during a cycle of motion in accordance with a pulse repetition period function which has a predetermined proportional relationship to the scanning velocity function. The varying step includes generating primary pulses at a fixed predetermined frequency and selecting only part of the primary pulses during each cycle in accordance with a preselected program whereby the frequency of the selected pulses varies in proportion to the scanning velocity function, and using the selected pulses to trigger respective ones of the sound pulses.

In the method according to the invention, a non-uniform motion is imparted to the sound beam so that simple drive means may be used and contrary to all previous proposals the section surface is scanned with a predetermined transverse resolution in that the pulse repetition period rather than the velocity of the scanning movement is varied. The ultrasonic examination and display equipment is now keyed virtually in dependence on the scanning movement of the sound beam.

Various arrangements can be used within the scope of the above-mentioned basic concept of the method. For instance, the frequency of primary pulses delivered by a clock may be varied by frequency modulation so as to obtain a uniform transverse resolution. In that case the modulation is changed by a member which performs a control movement in dependence on the scanning movement of the sound beam.

A simpler arrangement is believed to comprise a clock, which controls the entire equipment or generates the clock pulses in response to the operation of the scanning mechanism. In one mode of carrying out the method according to the invention, primary pulses are generated during each scanning cycle in response to the operation of the scanning mechanism in a number which is multiple of the number of sound pulses to be projected during that cycle and, in dependence on the instantaneous position of the sound beam relative to the section surface, only part of said primary pulses is used to trigger respective sound pulses (and to effect a corresponding line deflection on the fluorescent screen), in accordance with a preselected programme. In that case, interchangeable sound transducer heads which are basically identical or similar may be used in conjunction with the same primary pulse generators and differences between the motion of such different sound transducer heads may be compensated by a change of the selecting program. Any disturbances which could be misinterpreted as a primary pulse may then result in a display error only to an extent which corresponds to one primary pulse repetition period, which is only a fraction of the extent corresponding to the sound pulse repetition period.

In a particularly simple mode a scale is moved relative to a detector in unison with the scanning movement of the sound beam and the primary pulses are generated in response to that relative movement. Such scale might be replaced by a sequence of alternating light-transmitting and opaque fields having an irregular pitch so that the non-uniform scanning movement of the sound beam is compensated and scanning is effected with a constant transverse solution. It would be obvious to sample the scanning movement of the sound transducer head and to generate the sound pulses in response to said sampled movement. If such sampling means should not unduly increase the moving mass of the sound transducer head, suitable detectors may be mounted at a different location of the scanning mechanism at a member thereof which is moved in unison with the sound transducer, such as a drive shaft. In that case the functional relationship of the two motions, e.g., the relationship between the rotation of a shaft and of the pivotal movement of a sound transducer derived from that rotary motion, must be taken into account in designing the program for the sound pulse repetition period.

In equipment for carrying out the method according to the invention, trigger means is arranged to trigger each sound pulse so that their pulse repetition period varies during the cyclic movement in accordance with a pulse repetition period function which has a predetermined proportional relationship to the scanning velocity function. The trigger means is operable in response to the operation of the scanning mechanism to trigger a sound pulse whenever the sound path has performed a predetermined increment of the scanning movement, and the trigger means comprises a primary pulse generator for generating a predetermined number of primary pulses at a fixed predetermined frequency during each cycle.

Program-controlled means selects part of the primary pulses in accordance with a scanning control program for each cycle whereby the frequency of the selected pulses varies in proportion to the scanning velocity function, and triggers a sound pulse in response to each selected primary pulse.

Programming and the overall arrangement will be simplified if the trigger means comprises a program-stepping or resetting switch, which is actuated by the scanning mechanism or the sound transducer or sound transducer head in at least one predetermined position of the sound beam, particularly whenever a scanning cycle has been completed, and which in response to said actuation resets the program-controlled means or sets them for a predetermined step of the program.

According to a further feature, the program-controlled means comprise a scanning control memory having storage locations in a number which is at least as large as the number of primary pulses generated by the primary pulse generator during each scanning cycle and the contents of which are in accordance with a preselected schedule and the arrangement is such that trigger pulses for triggering sound pulses will be generated only when predetermined storage locations are read. The scanning control memory may be preceded by a counter, which is actuated by the primary pulses from the primary pulse generator and reset by the resetting pulses and which serve to address the scanning control memory.

A schedule may be provided not only for the generation of sound pulses. Because the path of each sound pulse relative to the scanned section surface is exactly defined, the associated addresses for the display on the fluorescent screen may be defined and stored at the same time. Those informations for the control of the deflection of base line on the fluorescent screen which are geometrically coordinated with the locations in the object which are defined by the scanning schedule are stored in a separate deflection control memory, which is read at the respective addresses in response to the trigger pulses. In the simplest case, these addresses of the display control memory are selected by a counter, which is actuated by the trigger pulses and reset by the above-mentioned resetting pulse.

The structural expenditure will be simplified if the scanning control memory and the display control memory consist of program read only memories or PROMs.

For various examination it may be necessary to exchange the sound transducer or sound transducer head or to change the range in which an object is scanned. When the operating conditions have thus been changed, the same primary pulse generator may still be used if selector switches are provided for a selection of addresses in other sections of the read-only memory or in separate memories in accordance with other scanning schedules. These switches may preferably be actuated jointly with selector switches for the control of the deflection geometry or for the scanning units of the scanning mechanism.

A somewhat more expensive arrangement will be recommendable particularly when the sound transducer heads and the scanning mode are changed relatively frequently and comprises programmed microprocessors for determining the scanning schedule and the deflection schedule in accordance with predetermined conditions arising in different scanning modes, which microprocessors are connected to position or velocity sensors or can be set for specific programs by programming means so that in dependence on the selected conditions (scanning range, number of lines per picture) the microprocessors compute the scanning schedule and the deflection schedule and in accordance therewith effect a programming of the memories, which preferably consist of random access memories or RAMs.

In a simple embodiment the primary pulse generator comprises a stroboscopic disc, which is mounted, e.g., on a drive shaft for imparting via a mechanism a pivotal movement to a sound transducer head, and photoelectric detector means associated with the stroboscopic disc.

In another embodiment, the primary pulse generator comprises an incremental scale and associated electric, particularly photoelectric detector means. Such arrangements have previously been used for a measurement of lengths and of angles in machine tools. The signals which represent the measurement consist in most cases of sine wave signals havng a wavelength corresponding to the scale pitch. By suitable measures, particularly by reading the scale at least at two points with a phase displacement and by the use of circuity including phase-dividing or multiplier circuits, the frequency of said signals may be multiplied -this is equivalent to an electronic subdivision of the scale pitch and signals may be generated which depend on the direction of the movement of the scale relative to the detector. These signals may then be used as primary signals.

The above-mentioned subdivision by a phase-displaced reaching of a scale at two points will be permitted and disturbances caused by a possible soiling of the scale or the stroboscopic disc will be substantially precluded if at least one detector is provided which comprises a series of passages adjacent to a plurality of openings or lands of the stroboscopic disc of scale or if two sequences of alternating opaque and light-transmitting areas are moved relative to each other adjacent to a single detector.

BRIEF DESCRIPTION OF THE DRAWING

Illustrative embodiments of the invention are shown by way of example on the accompanying drawings, in which.

DETAILED DESCRIPTION

Figure 1:
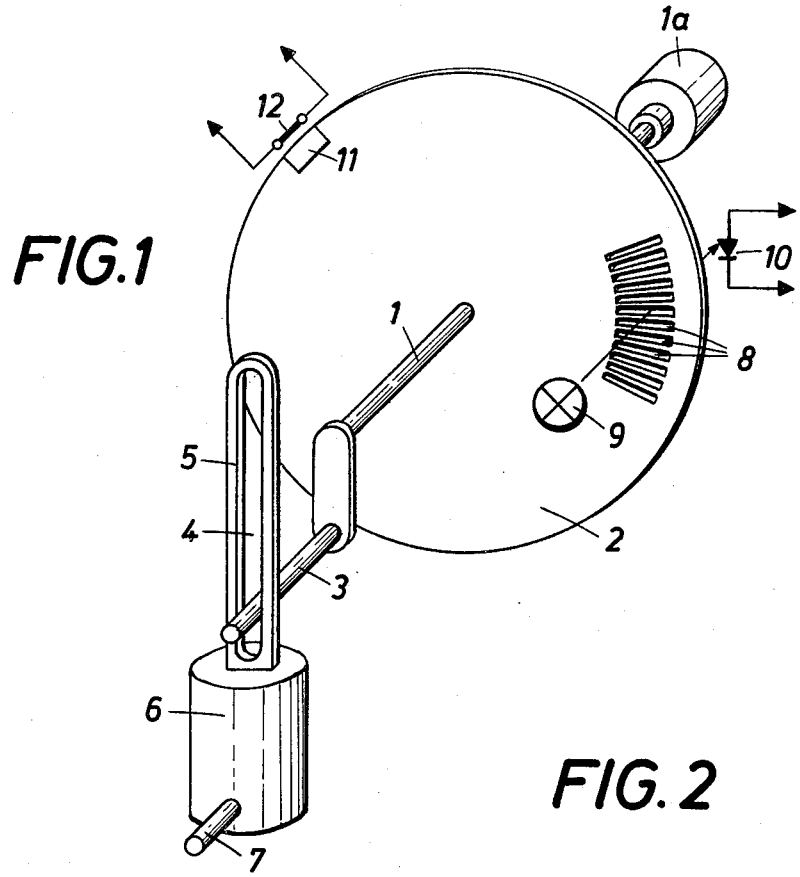
FIG. 1 is a basic arrangement comprising a pivotally movable sound transducer head, means for driving said head and a primary pulse generator operated by said drive means.

FIG. 1 shows a shaft 1, which is driven at an approximately constant speed by a motor 1a. A stroboscopic disc 2 is fixed to the shaft 1, which at one end forms a crank 3, which extends through a slot 4 in a lever 5. By said lever 5, an oscillating pivotal movement about a horizontal axis 7 is imparted to a sound transducer head 6, which comprises a sound transducer. When the angular movement of the shaft 1 is designated (a), the angular movement of the sound transducer head 6 is designated (b), the radius of the crank is designated (r) and the distance between the pivotal axis 7 and the axis of the shaft 1 is designated (d), the following relationship exists:

$$b = \arctan\left(\frac{r \times \sin a}{d - r \times \cos a}\right)$$

Other relationships will be obtained if the slot 4 is not straight but curved, e.g., in the form of a curved cam slot. Besides, the simple crank drive 1,3 may be replaced by a plurality of links. In any case, there is a definite functional relationship between the angular movement (b) of the sound transducer head 6 and the angular movement (a) of the shaft 1 so that the general statements $$b=f(a) \text{ or } a=g(b)$$

can be made. Similar relationships will be obtained if the crank drive 1, 3 is used to reciprocate a slide which carries the sound transducer head so that the movement (b) is a linear movement.

It has been mentioned before that the stroboscopic disc 2 is secured to the motor shaft 1. Throughout its periphery, the disc 2 is provided with regularly spaced, light-transmitting slots 8. A light source 9 and a light sensor 10, such as a photodiode, are disposed on opposite sides of the disc 2 adjacent to the slots 8. The disc 2 carries also a control element 11, such as a magnet, which opens for a short time a normally closed resetting switch 12 once during each revolution of the disc 2. The switch 12 could be alternatively actuated by different means, which may be electrical, photoelectric or mechanical. The pitch of the slots 8 could be varied so that pulses are projected by the sound transducer head 6 with pulse repetition periods corresponding to equal increments of angular movement in response to the output pulses of the photodiode 10. The stroboscopic disc 2 may be so large that it permits a generation of an adequate number of primary pulses. In the embodiment shown by way of example, the slots 8 are spaced regularly and are much larger in number than the sound pulses to be projected during a complete scanning cycle of the reciprocating sound transducer head.

Figure 2:
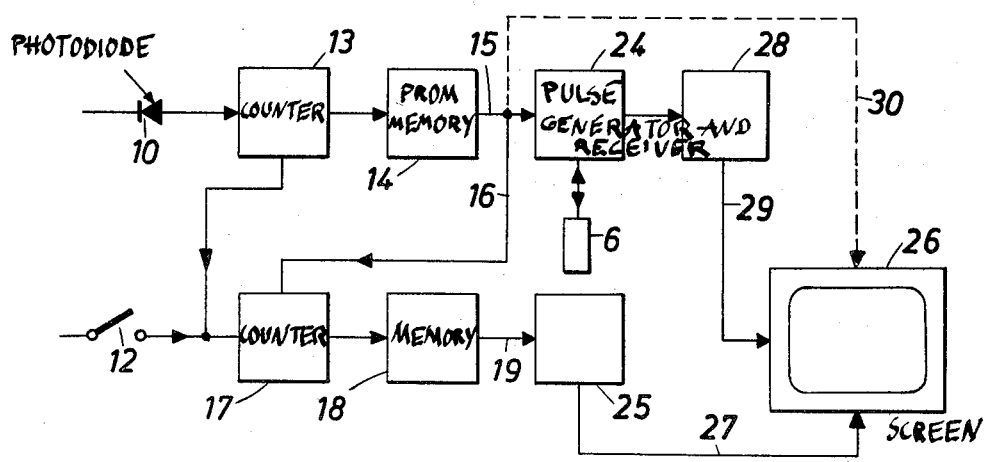
FIG. 2 is a block circuit diagram illustrating how the primary pulses delivered by the detector are utilized.

It is apparent from FIG. 2 that primary pulses generated by the primary pulse generator 8, 9, 10 are applied to a counter 13, which advances one step in response to each primary pulse and returns to its initial position when the switch 12 is opened. Each count of the counter 13 designates an address of a memory 14, which in the illustrated embodiment consists of a PROM, which at each storage location stores either a '0' or a '1' in accordance with a preselected program. The memory 14 is connected by a lead 15 to the pulse generator and receiver 24 of the ultrasonic examination and display equipment and is connected by a lead 16 to another counter 17. If a '0' is stored in the memory 14 at the storage location selected by the counter 13, no signal will appear in leads 15, 16. If a '1' is stored at the selected location, an output signal will be delivered via lead 15 to activate the pulse generator 24 so that a sound pulse is projected by the sound transducer head 6, and the counter 17 is advanced one step. The counter 17 constitutes the address selector for another memory 18, which consists also of a PROM. The memory 14 is a scanning pulse control memory and the memory 17 a deflection control memory, in which one or more values determining the deflection of the base line of a fluorescent screen of the ultrasonic examination and display equipment is or are stored at each storage location. When a given storage location of the memory 18 has been addressed the value or values stored therein are fed via a lead 19 to the deflection control unit 25. In response to said value or values and to the sawtooth voltage applied to the control unit 25 via a lead that is not shown, the control unit 25 generates the voltages required to deflect the base line on the fluorescent screen 26. These voltages are delivered via lead 27. In response to the opening of the switch 12, the counter 17 is also reset to its initial position. Echoes generated in response to the sound pulses projected by the sound transducer head 6 are received by the latter and converted into echo signals, which are delivered to the pulse generator and receiver 24 and are amplified and shaped in a processing unit 28 and then delivered via a lead 29 and used to unblank the tracing ray. The dotted line 30 indicates that the vertical deflection may alternatively be controlled via the lead 15.

It has already been mentioned that the number of slots 8 greatly exceeds the number of sound pulses to be projected during each scanning cycle of the pivotally moving sound transducer head. As a result, the pulse repetition period of the projected sound pulses can be varied in steps so that the section surface is scanned with a transverse resolution which is uniform to a fairly close approximation. Any disturbing signals will not appreciably affect the accuracy of the display. When it is assumed that the number of slots is ten times the number of sound pulses required, a disturbing pulse would cause the sound pulse to be triggered too early by a time which corresponds to 10% of the sound pulse pitch. If the transverse resolution amounts to 0.5°, the actual error will amount to 0.05°. Because of the resetting effected by the switch 12, that error will arise only during the scan in which the disturbing pulse occured.

A selection of the transverse resolution with which the section surface is to be scanned and an adaptation of the equipment to different sound transducer heads or scanning ranges may be effected if the memories 14 and 18 are replaced by memories having different programs for the scanning control and the deflection control. Alternatively, the memories which are used may have a much larger storage capacity than is required for one scanning control program or deflection control program so that a plurality of scanning control programs or deflection control programs can be stored at different storage locations. In that case, selector switches may be provided for effecting a change to another scanning control program and another deflection control program. Alternatively, such change can be effected in that adders are associated with the counters 13 and 17 and in response to a change of the program add a certain number to the count of the respective counter so that the correct address is obtained.

Figure 3:
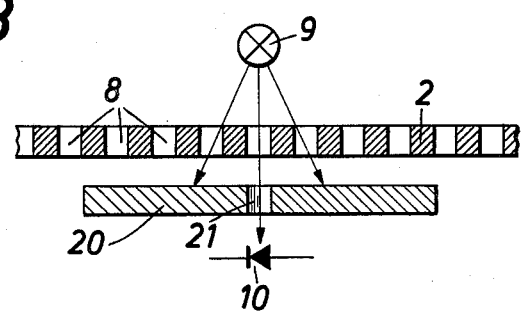
FIGS. 3 and 4 are diagrammatic sectional views showing two different detector arrangements.

FIG. 3 is a sectional view showing the scanning unit of FIG. 1. In order to avoid an influence of extraneous light on the photodiode 10, the latter is preceded by a stop plate 20, which has a hole 21. One of the slots 8 of the disc 2 may become clogged so that a primary pulse is skipped and an error results. In accordance with FIG. 4, this is avoided in that the lamp 4 is succeeded by a lens 22, which spreads the emitted light in parallel rays over a plurality of slots. The stop plate 20a has a corresponding number of holes 21a and thus constitutes an array of passages, which is succeeded by another lens 23, which focuses the light onto the photodiode. Even when one slot of the disc 8 is clogged in that arrangement, a primary pulse, which in that case has a somewhat smaller amplitude, will be generated in response to the movement of the disc 2 relative to the hole arrays 20a, 21a.

The memories 14 and 18 are programmed by the manufacturer of the equipment by means of a programming device. Instead of the PROMs, normal memories or RAMs may be used if the equipment includes microprocessors in which the scanning control program and the deflection control program are automatically computed, whereafter the programs are stored in the respective memories. In computing such programs, these microprocessors will utilize input parameters which include the functional relationship between the angular movement of the drive shaft and the scanning movement of the sound beam as well as the number of sound pulses desired per scan.

Figure 4:
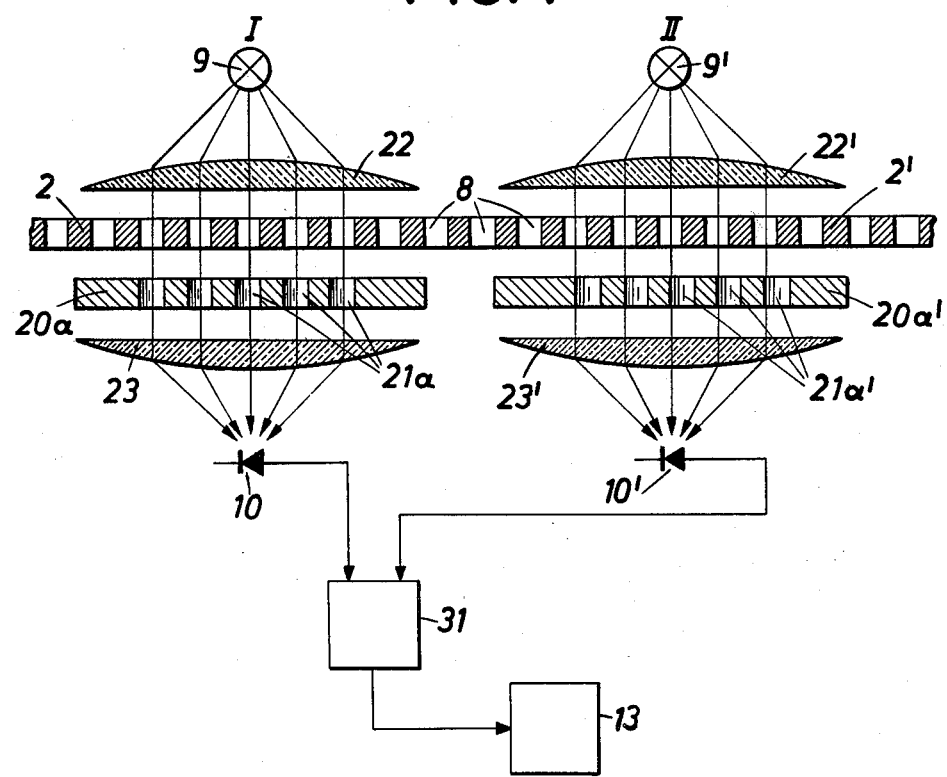

So far, only the function of one detector I has been described with reference to FIG. 4. The embodiment shown by way of example comprises two detectors I and II, and the detector II consists of the same elements as the detector I. In the detector II, these elements are designated 9', 10' etc.

The two detectors I and II comprising the stop plates 20a and 20a' are arranged relative to the disc 2 with a phase displacement so that the holes 21a and 21' are in perfect register with the slots 8 of the disc 2 in different angular positions of the latter. As a result, the signals generated by the photodiodes 10, 10' are displaced in phase. These signals are fed to a processing device 31, in which they are subjected to an electronic processing that is equivalent to a subdivision of the slot pitch. The output signals of the processing device 31 are applied to the counter 13.

For length measurement it is known to provide circuits in which phase-displaced signals resulting from a reading of a scale, particularly of an incremental scale, are subjected to an electronic multiplication corresponding to subdivision of the existing scale. Phase multiplier circuits and potentiometer circuits have been used for the electronic multiplication. Such circuits have been described, e.g., in German Patent Publication No. 1,231,911 and the U.S. Pat. Nos. 3,496,374; 3,371,335; and 3,671,750.

If a suitable circuit is employed in the processing device 31, the same may be used to generate a plurality of length-measuring signals per scanned hole and the offset detector I, II in conjunction with the circuit 31 may be used to detect the direction of movement if the disc 2 or a corresponding scale is oscillated rather than moved always in one direction.

What is claimed is:

1. A method of ultrasonic examination in which a beam of sound pulses is cyclically moved to scan an object in a preselected section surface at a scanning velocity which varies during each cycle in accordance with a scanning velocity function, comprising generating echoes in said section surface in response to said sound pulses are represented on a plotting surface at locations which are geometrically coordinated with the locations at which corresponding echoes have originated in said section surface, varying the pulse repetition period of said sound pulses during a cycle of motion in accordance with a pulse repetition period function which has a predetermined proportional relationship to said scanning velocity function, said varying step including generating primary pulses at a fixed predetermined frequency, and selecting only part of said primary pulses during each of said cycles in accordance with a preselected program whereby the frequency of said selected pulses varies in proportion to said scanning velocity function, and using said selected pulses to trigger respective ones of said sound pulses.

2. A method as set forth in claim 1, in which said program is repeated in each of said cycles.

3. A method as set forth in claim 1, in which said primary pulses are generated in a number which is a multiple of the number of pulses thus selected.

4. A method as set forth in claim 1, in which
a scale and a detector are cyclically moved relative to each other to perform one cycle during each of said cycles and
said primary pulses are generated by said detector in response to said relative movement of said scale and detector.

5. Ultrasonic examination equipment comprising a sound transducer defining a sound path and operable to project a beam of sound pulses along said sound path into an object and to derive electric echo signals from echoes generated in said object in response to said sound pulses, a scanning mechanism operable to impart to said sound path a cyclic movement in a preselected section surface in said object at a scanning velocity which varies during each cycle in accordance with a scanning velocity function, trigger means arranged to trigger each of said sound pulses so that their pulse repetition period varies during said cyclic movement in accordance with a pulse repetition period function which has a predetermined proportional relationship to said scanning velocity function, said trigger means being operable in response to the operation of said scanning mechanism to trigger a sound pulse whenever said sound path has performed a predetermined increment of said scanning movement, and said trigger means comprising a primary pulse generator for generating a predetermined number of primary pulses at a fixed predetermined frequency during each of said cycles, and program-controlled means for selecting part of said primary pulses in accordance with a scanning control program for each of said cycles whereby the frequency of said selected pulses varies in proportion to said scanning velocity function, and for triggering a sound pulse in response to each of said selected primary pulses, and plotting means comprising a plotting surface and arranged to represent said echo signals on said plotting surface at locations which are geometrically coordinated with the locations at which the corresponding echoes have originated in said section surface.

6. Equipment as set forth in claim 5, in which said trigger means comprise a program-stepping switch arranged to set said program-controlled means to a predetermined step of said program when said sound path is in a predetermined position.

7. Equipment as set forth in claim 5, in which said trigger means comprise a resetting switch arranged to reset said program-controlled means whenever one of said cycles has been completed.

8. Equipment as set forth in claim 5, in which said primary pulse generator is arranged to generate primary pulses in a number which is a multiple of the number of sound pulses required during the same time.

9. Equipment as set forth in claim 8, in which said program-controlled means comprise scanning control memory means having a storage location for each of said primary pulses to be generated by said primary pulse generator during each of said cycles, said scanning control memory means being adapted to store trigger information at selected ones of said storage locations in accordance with said scanning control program, trigger pulse-generating means for reading said storage locations in a predetermined sequence in response to successive ones of said primary pulses and for generating a trigger pulse for triggering one of said sound pulses in response to the reading of each of said selected storage locations.

10. Equipment as set forth in claim 9, in which
said trigger pulse-generating means comprise a counter for addressing said storage locations in said predetermined sequence in response to successive ones of said primary pulses and
said trigger means comprise a resetting switch arranged to reset said counter whenever a scanning cycle has been completed.

11. Equipment as set forth in claim 9, in which said program-controlled means comprise deflection control memory means having a storage location for each of said trigger pulses to be generated during each of said scanning cycles, said deflection control memory means being adapted to store deflection control information at each of said storage locations thereof, and deflection control means for reading said deflection control information at said storage locations of said deflection control memory means in a predetermined sequence in response to successive ones of said trigger pulses and for deflecting a base line on said plotting surface in response to the deflection control information thus read.

12. Equipment as set forth in claim 11, in which
said trigger pulse-generating means comprise a first counter for addressing said storage locations of said scanning control memory means in said predetermined sequence thereof in response to successive ones of said primary pulses, said deflection control means comprise a second counter for addressing said storage locations of said deflection control memory means in said predetermined sequence thereof in response to successive ones of said trigger pulses, and said trigger means comprise a resetting switch arranged to reset said first and second counters whenever a scanning cycle has been completed.

13. Equipment as set forth in claim 11, in which said deflection control memory is a programmed read-only memory (PROM).

14. Equipment as set forth in claim 11, in which said scanning control memory means comprise a plurality of sets of read-only storage locations and trigger information is stored at selected ones of said storage locations of each of said sets in accordance with different scanning control programs for respective sets, said deflection control memory means comprise a plurality of sets of read-only storage locations and deflection control information is stored at selected ones of said storage locations of each of said sets in accordance with different deflection control programs for respective sets, and said trigger means comprise a selector switch for causing said trigger pulse-generating means to read the storage locations of a selected one of said sets of storage locations of said scanning control memory means and for causing said deflection control means for reading the storage locations of a selected one of said sets of storage locations of said deflection control memory means.

15. Equipment as set forth in claim 9, in which said scanning control memory means comprise a plurality of sets of read-only storage locations and trigger information is stored at selected ones of said storage locations of each of said sets in accordance with different scanning control programs for respective sets, and said trigger means comprise selector switch for causing said reading means to read the storage locations of a selected one of said sets of storage locations.

16. Equipment as set forth in claim 15, in which said plurality of sets of storage locations are comprised in a single memory.

17. Equipment as set forth in claim 15, in which said scanning control memory means comprise a plurality of memories, each of which comprises one of said sets of storage locations.

18. Equipment as set forth in claim 15, in which said scanning mechanism is adapted to impart to said sound path said cyclic movement under different sets of scanning conditions in dependence on the state of said selector switch.

19. Equipment as set forth in claim 5, in which said primary pulse generator comprises an incremental scale, a detector for reading said scale, and means for cyclically moving said scale and said detector relative to each other in step with said cyclic movement of said sound path.

20. Equipment as set forth in claim 19, in which said scale consists of a series of holes in a stroboscopic disc.

21. Equipment as set forth in claim 19, in which said detector is operable to produce output pulses in response to said relative movement and said primary pulse generator comprises means electronic generating said primary pulses at a pulse repetition frequency which is a plurality of the pulse repetition frequency of said output pulses.

22. Equipment as set forth in claim 19, in which said scale has a plurality of fields, which constitute scale increments, and a reading array extending over a plurality of said fields is disposed between said scale and said detector and immovable relative to said detector.

23. Equipment as set forth in claim 22, in which said reading array consists of a mask.

* * * * *